United States Patent Office 3,552,765
Patented Jan. 5, 1971

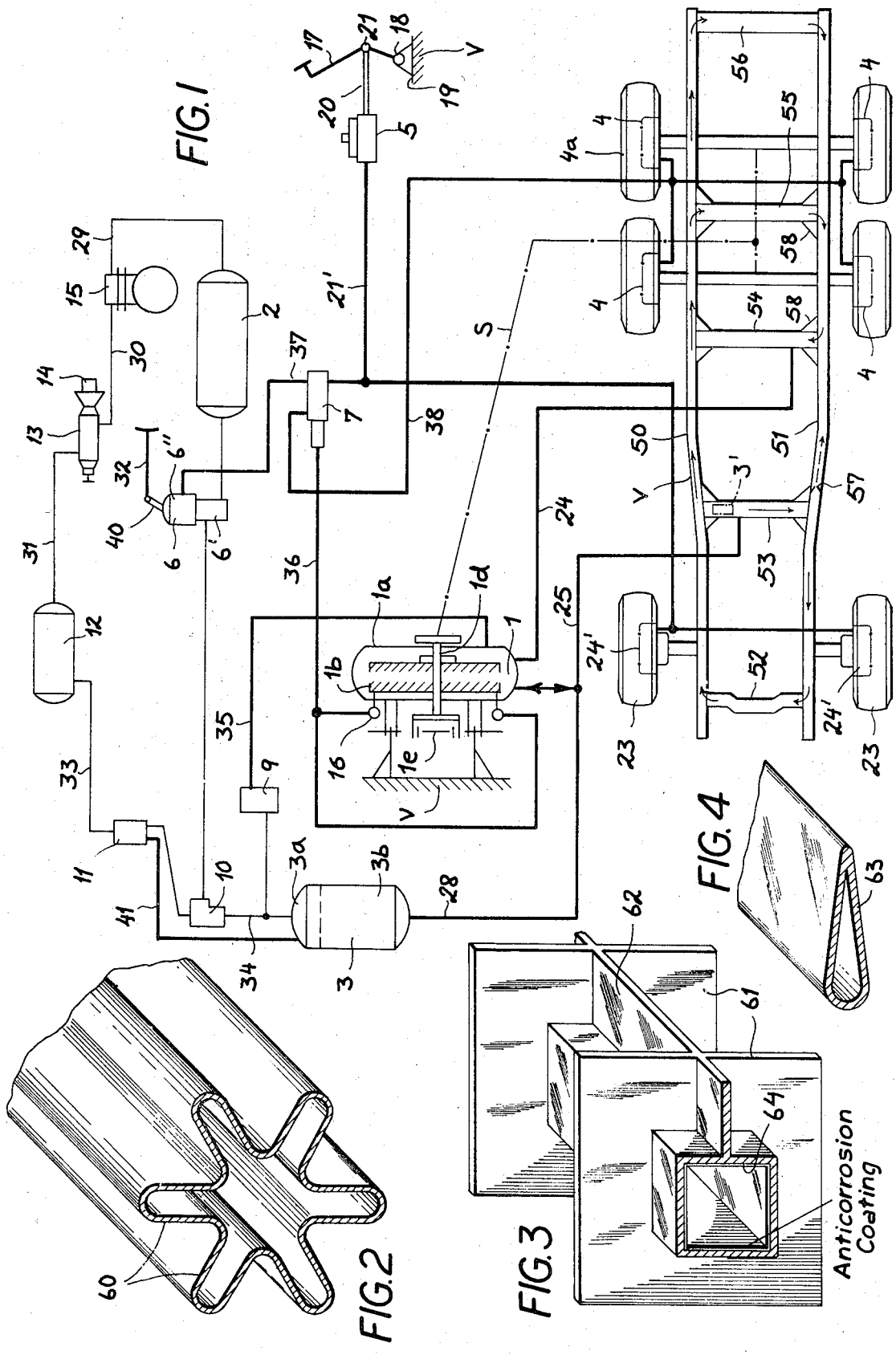

3,552,765
HYDRODYNAMIC-BRAKE SYSTEM WITH HEAT DISSIPATION FROM THE CHASSIS
Fritz Ostwald, Buchschlag, Germany, assignor to Alfred Teves G.m.b.H., Frankfurt am Main, Germany, a corporation of Germany
Filed Sept. 17, 1968, Ser. No. 760,162
Claims priority, application Germany, Sept. 21, 1967,
T 34,842
Int. Cl. B62d 21/00
U.S. Cl. 280—106                                    9 Claims

ABSTRACT OF THE DISCLOSURE

A hydrodynamic-brake system for an automotive vehicle, especially heavy-duty trucks, trailer-tractor combinations, and semitrailers in which the hydrodynamic brake circulates a braking fluid which is heated in proportion to the degree of braking of the vehicle, the heat being dissipated by the chassis. The chassis or vehicle frame is provided with ducts through which the hydrodynamic-brake system circulates the braking fluid to dissipate the braking energy in the form of heat by indirect heat exchange with the air via the thermally conductive chassis or a portion thereof.

---

My present invention relates to hydrodynamic-brake systems in which the kinetic energy of an automotive vehicle, especially a heavy-duty automotive vehicle, is converted into heat of a braking fluid which is pumped by the hydrodynamic break, the heat being dissipated into the atmosphere.

In the commonly assigned copending application Ser. No. 669,941, filed September 22, 1967 (now U.S. Pat. 3,449,017) and in the application Ser. No. 668,462 which is also commonly owned, there are described and claimed vehicle-brake installations having a hydrodynamic brake of the type generally disclosed in commonly assigned Pats. 3,265,162 of Aug. 9, 1966, and 3,302,955 of Feb. 7, 1967, or in the U.S. Pats. 1,297,225 and 2,241,189. As pointed out in the copending applications mentioned above, the hydrodynamic brake generally consists of a toroidal or cylindrical shell half which is connected to the rotating shaft to be braked (e.g., an axial shaft of the automotive vehicle) while a confronting, generally similar shell half is mounted upon the relatively stationary support, e.g., the vehicle chassis, body or frame. The mutually facing concavities of the shell halves define an annular chamber whose vanes subdivide it into a plurality of generally segmental compartments receiving a hydraulic braking fluid. The hydraulic fluid is pumped around the veins by the rotor and stator shell members and establishes a pressure differential thereacross. A transmission line completes the braking assembly by coupling the hydrodynamic brake to a heating exchange system.

While the pressurization of liquid within the hydrodynamic brake determines the brake efficiency, it is the dissipation of the heat generated by the pumping action which renders the system effective. In other words, the greater the brake action of the hydrodynamic brake, the more the fluid is pumped and agitated and the greater is the frictional heat evolved in the liquid. It has been proposed, as is discussed in the aforementioned patent applications and Letters Patent, that the heat exchanger in which the braking heat is dissipated be the radiator of the automotive vehicle or a separate heat exchanger which, in turn, is cooled by the engine coolant as it is circulated from the engine through the hydrodynamic brake heat exchanger and the vehicle radiator. In each case, the thermal energy is eventually dissipated into the atmosphere.

Consequently, by contrast to friction brakes in which the kinetic energy of the rolling vehicle is converted into sliding-friction heat between the wheel and the ground and between the slidably engaging surfaces of the brakeshoe and the disk or drum, the hydrodynamic brake or decelerator converts the kinetic energy of the rolling vehicle into thermal energy in a circulating liquid. It is important that the fluid be circulated rather than eliminated from an economic standpoint and substantially all efforts in dissipating this thermal energy have concentrated upon the fact that the normal vehicle possesses a radiator in which the engine heat is dissipated to the atmosphere. Consequently, different systems have been suggested to include the hydrodynamic braking heat in that dissipation system.

In automotive vehicles, however, problems have arisen because of the desire on the one hand to occupy as little space as possible with additional heat exchangers or larger heat exchange units and, on the other hand, with the desirability to have as large a heat exchange surface as possible so as to dissipate a maximum amount of braking heat. In the past, systems in which the engine cooler and the liquid from the hydrodynamic brakes were passed in a heat-exchanging relationship have proved to be mere compromises. Moreover, such arrangements open the door to leakage of two liquids from relatively long channels as are provided in such heat-exchange systems. Additionally, the utility of hydrodynamic brakes has been found to be practically limited by the fact that heavy-duty motor vehicles, especially when climbing hills or negotiating difficult terrain or when under extraordinary loads, have a tendency to overheat, thereby raising the temperature of the coolant to a level severely limiting the amount of heat which can be absorbed by this coolant from the hydrodynamic brake. Consequently, brake efficiency falls off, thereby creating problems, especially at higher speeds of the heavy-duty vehicles.

It is an object of this invention to provide an hydrodynamic-brake system wherein the aforementioned disadvantages can be obviated and high braking efficiency maintained with considerable simplification of the heat-dissipation arrangement.

This object and others which will become apparent hereinafter are attained, in accordance with the present invention, by eliminating the usual heat exchanger present in hydrodynamic-brake systems and constituting the heat-dissipation unit of the hydrodynamic brake from the vehicle body, chassis or frame. According to the present invention, therefore, the vehicle chassis, body or frame is provided with heat-conductive tubes either by securing such tubes to the steel or other metal profiles and structural elements constituting the frame of the chassis or by forming the frame members themselves as tubes. The latter construction is, of course, preferred. In fact, the frame or chassis may be constituted of circular-section pipe or may be of boxlike construction as is achieved when two channel members are welded together in facing relationship.

According to a more specific feature of this invention, the chassis frame members which are exposed to air along the underside of the vehicle and thus rapidly dissipate the braking heat, may be formed with longitudinally extending or transverse, fins, ribs or corrugations designed to increase the heat-exchange area and, simultaneously, serving as stiffeners for the frame structure itself. Moreover, the frame members can be shaped so as to increase the effective speed of the air along the frame surfaces, thereby increasing the rate of heat transfer to the air.

Another feature of the present invention resides in the introduction of anticorrosion agents, e.g., oils, in the circulating hydrodynamic fluid which is passed through the vehicle frame so that the interior of the frame members are coated and corrosion prevented.

The above and other objects, features and advantages of the present invention will become more readily apparent from the following description, reference being made to the accompanying drawing in which:

FIG. 1 is a diagram of a hydrodynamic-brake system embodying the present invention; and FIGS. 2–4 are fragmentary perspective views showing various profiles of the structural members which have been found to be advantageous.

In FIG. 1, I show a hydrodynamic-brake system of the type generally described and claimed in the aforementioned copending applications. The brake system of FIG. 1 comprises a hydrodynamic brake 1 whose housing 1a contains a first axially concave generally toroidal vaned member 1b which is affixed to a non-rotatable part of the vehicle (truck) V, e.g., its chassis, and confronts an oppositely concave vaned toroidal member 1c coupled with the drive shaft 1d of the vehicle. This shaft is represented by the dot-dash line S as being diagrammatically coupled with the rear wheels 4a whose wheel-brake cylinders 4 form part of a friction brake system co-ordinating with the hydrodynamic brake 1 to bring the vehicle to a standstill. The shaft 1d may be driven by the differential 1e of the power train. During normal brake operation, the brake pedal 17, which is fulcrumed at 18 to the vehicle chassis 19, is depressed to drive the piston rod 20 (articulated at 21 to the brake pedal) to the left and shift the piston within the brake master cylinder 5 to force hydraulic fluid through the conduit 21'. This line also supplies the front-wheel brake cylinders 22 whose wheels 23 and axles are not associated with any hydrodynamic brake so that normal mechanical friction-brake action occurs at this wheel. The rotation of members 1b and 1c of the hydrodynamic brake 1 circulates hydraulic fluid through the lines 24 and 25 of a cooling circuit a heat exchanger 8 constituting the vehicle frame. A pressure accumulator, charging cylinder or hydraulic reservoir 3 is shown to have its upper end 3a supplied with air under pressure or exposed to suction via a switchover valve 10 (FIGS. 2 and 3) while its lower end 3b communicates via line 28 with the hydrodynamic brake 1.

A compressor 15, driven by the engine of the vehicle or a separate motor, has its discharge or elevated-pressure port connected via a line 29 to the pressure source of the charging cylinder 3 which is represented by a compressed-air storage tank 2 connected with compressor 15 at the discharge port 29 of the latter. The suction or intake port of the compressor 15, at which the subatmospheric or reduced pressure is generated, communicates via line 30 with an automatic suction-bypass valve 13 whose intake 14 opens to the atmosphere via an air filter. This valve, conventional in suction systems in which both the pressure and suction sides of the compressor are used, communicates via line 31 with the reduced-pressure source (suction tank 12) of the valve 10. The tank 12 is connected with valve 10 via line 33 and an oil separator 11. The oil separator 11, in which any oil induced to flow upwardly from the charging cylinder 3 toward the suction tank 12 is accumulated and returned thereto via line 41, mechanically traps the oil particles. The gas chamber 3a of charging cylinder 3 communicates also with a pressure-equalizing valve 9 which, in turn, communicates with the hydrodynamic brake 1 via a line 35. As described in Pat. No. 3,265,162, a feed-back arrangement is provided between the hydraulic decelerator or hydrodynamic brake and the control means therefor to ensure that the brake force applied to the shaft S remains constant.

The feedback means may comprise a servofollower represented at 16 and of the type described in the last-mentioned patent. The servofollower communicates via a hydraulic line 36 with the servofollower valve 7 connected between line 21' of the master cylinder 5 and the lines 37 and 38 delivering the brake fluid to the control valve 6 and the wheel-brake cylinders 4, respectively. The control valve 6, whose valve member is received in the valve body 6' and regulates the flow of compressed air from tank 2 through line 39 to the switchover valve 10, has a hydraulically operated cylinder 6" isolated from the pneumatic chamber 6' and provided with a mutually actuatable arm 32 which is able to operate the control valve 6 even when the pedal is not depressed.

When the vehicle is traveling at more or less constant speed with the brake system in a deactuated steady-state condition and no braking is required, the compressor 15 draws air through the valve 13 from the suction tank 12 while forcing air under pressure into the compressed air tank 2. The reduced pressure at the intake side of the compressor 15 is applied through the tank 12 via line 33 and the oil separator 11 to the suction port of the valve 10 (see application Ser. No. 668,462) and transmitted through this valve and line 34 to the gas chamber 3a overlying the hydraulic fluid level within the charging cylinder 3.

Since the charging cylinder 3 is here at subatmospheric or negative pressure, the hydraulic fluid is drawn inwardly from line 28 and hydrodynamic brake 1 which is thereby rendered ineffective and pumps only insignificant quantities of liquid in the idle condition. As soon as the vacuum in tank 12 and the gas space 3a reaches a predetermined absolute value (as established by the bypass valve 13), i.e., when the pressure falls in tank 12 to a predetermined level, valve 13 shifts to block line 31 and communicates between the filtered intake 14 and the suction port of compressor 15, thereby allowing continuous operation of stant pressure at the tank 12. Air is pumped into the pressure tank 2 during this period and communication between tank 12 and compressor 15 is only restored when the absolute pressure in tank 12 increases to a level sufficient to trip the valve 13, block the intake 14 and reconnect compressor 15 with tank 12.

When the vehicle is engaged in normal road operation and no brake action is required, the pedal 17 is not depressed and no hydraulic fluid is forced from the master cylinder 5 through the line 21' to either of the wheel-brake cylinders 4 and 21 or to the servocontrol valve 7. The negative pressure in chamber 3a of the charging vessel 3 precludes any pumping action of the hydrodynamic brake 1. When the operator presses upon pedal 17 to shift the piston of master cylinder 5 to the left and thereby force hydraulic fluid into the servocontrol valve 7 and the front-wheel brake cylinder 22, initial friction-brake action is commenced. The rear-wheel brake cylinder 4 is actuated via the servovalve 7 simultaneously with the delivery of hydraulic fluid via line 37 to the dual control valve 6 which is thus hydraulically biased to form a path between the air-pressure tank 2 and the reversing valve 10. As described in application Ser. No. 668,462, the latter is actuated by the pressure increase in line 39 to form a path between the air-pressure tank 2 and chamber 3a while blocking communication between the vacuum tank 12 and the vessel 3. The gas-pressurized hydraulic fluid is thus forced via line 28 into the hydrodynamic brake 1 and the latter is thereby rendered effective; hydraulic fluid is now pumped by the relatively rotating members 1b and 1c of the hydrodynamic brake along the circulation path 24, 25 which includes the heat exchanger 8, thereby dissipating the dynamically developed braking heat. An equalizing valve 9 is provided between the charging vessel 3 and the hydradynamic brake 1 to ensure pressure equality between them. When the hydrodynamic brake is rendered effective, (by pressurization of chamber 3a), the stator 1b receives a reaction force, which is proportional to the brake force and effectiveness and is transferred to the sensor 16; the latter delivers a control movement to the valve member of servovalve 7 (see U.S. Pat. No. 3,265,162). Servovalve 7, in turn, varies the hydraulic pressure applied by line 37 to the control valve 6 and, via line 38, to the wheel-brake cylinder 34 such that the sum of the brake moments of the hydrodynamic brake and the mechanical-friction brake corresponds, regardless of the rate of rotation of the shaft 1d, to a predetermined value associated with the extent of depression of the brake pedal 17 and the corresponding braking effectiveness of a totally mechanical-brake system. Thus at relatively slow speeds, i.e., when the hydrodynamic brake effectiveness is minimum, the valve 7 permits the full brake force determined by the setting of master cylinder 5 to be applied to the wheel-brake cylinder 4, thereby bringing the vehicle to standstill. When the vehicle is operated at elevated speeds and the hydrodynamic brake is most effective, a brake-actuating depression of pedal 17 gives rise to an increased pressure in the hydrodynamic brake and practically no pressure in the wheel-brake cylinder 4. Control valve 6 may be mutually actuated at 32 for relatively long periods of downhill travel when only hydrodynamic braking is required.

The vehicle frame V of FIG. 1 is shown to comprise a pair of longitudinal members 50 and 51 of circular-section pipe which are interconnected by flattened tubular members 52, 53, 54, 55 and 56 welded to the longitudinal members 50 and 51 and communicating therewith. A throttle in the form of a perforated block is welded at 57 in longitudinal member 51 so as to split the flow of the hydrodynamic-bake fluid as indicated by the solid-line and broken-line arrows in this figure.

It may be seen that the members 54 and 55 are reinforced by triangular webs 58 which act as stiffners and simultaneously increase the effective heat-exchange area. The hydrodynamic-brake fluid is led via the line 25 from the hydrodynamic brake 1 into the cross member 53 from whence the major part of the hydrodynamic brake fluid passes to the left along the longitudinal member 51 to the tubular crosspiece 52 and thence along the longitudinal member 50. Circulation is completed via the frame members 55 and 56 which split the return flow between them and lead again to the longitudinal member 51 from which the cooled fluid is returned to the line 27 at the crosspiece 54. At 3′, I have shown a compartment in the frame member 53 which, if desired, may serve as the reservoir or accumulator 3 in accordance with another aspect of the present invention. In the latter case, the duct 28 will also be constituted by the frame member.

It will be evident that this arrangement has the substantial advantage that the spatial requirements of accumulators, reservoirs, heat exchangers and duct work are eliminated and the available heat-transfer area increased substantially not only because of the surface area of the frame members but as a consequence of heat conduction to the metal parts commonly secured thereto.

The desired degree of turbulence or nonturbulent flow may be adjusted by proper shaping of the surfaces of the ducts to thereby alter the surface speed and change its relationship to the Reynolds number. Thus, in FIG. 2, I show the tubular frame member to be provided with several corrugations 60 while in FIG. 3, a box profile structural member is provided and is formed with transverse ribs or fins 61 and one or more longitudinally extending fins 62. The velocity of the air flow across the surface may be increased by using streamlined configurations as shown in 63 in FIG. 4. Regardless of the embodiment used, I prefer to render the interior of the channels of the chassis or frame corrosion-resistant by applying thereto a coating 64 (FIG. 3) which may be deposited from the hydrodynamic brake fluid and preferably is an oil or metallo-organic compound which does not affect the hydrodynamic brake properties of the brake fluid.

The improvement described and illustrated is believed to admit of many modifications within the ability of persons skilled in the art, all such modifications being considered within the spirit and scope of the invention except as limited by the appended claims.

I claim:

1. In a hydrodynamic brake system for an automotive vehicle having a chassis and a hydrodynamic brake for said vehicle adapted to convert braking atcion to heat of circulatable hydrodynamic-brake fluid, the improvement wherein said chassis is formed at least in part with channels and said hydrodynamic brake is connected in a fluid circulating path with said channels to circulate said hydrodynamic brake fluid therethrough and dissipate braking energy to the air by heat transfer from said chassis, said chassis being formed with a supporting frame, said frame being composed of tubular structural members defining said channels and of a configuration and disposition enabling movement of air thereover during motion of the vehicle to dissipate said energy to the air passing over said members.

2. The improvement defined in claim 1 wherein said channels extend substantially throughout said frame, and said fluid is circulated substantially all around said frame through said channels.

3. The improvement defined in claim 1 wherein said structural members are formed with ribs adapted to increase the heat-dissipating surface area of said members.

4. The improvement defined in claim 3 wherein said ribs constitute stiffening formations increasing the mechanical strength of said members.

5. The improvement defined in claim 3 wherein said ribs are corrugations integrally formed in said members.

6. The improvement defined in claim 3 further comprising an anticorrosion coating along the interior of said members.

7. The improvement defined in claim 3 wherein said members are of box-like section.

8. The improvement defined in claim 3 wherein said structural members are of circular section.

9. The improvement defined in claim 3 wherein at least one of said members is formed with a hydrodynamic-brake fluid reservoir communicating with said hydrodynamic brake.

References Cited

UNITED STATES PATENTS

| 2,963,118 | 12/1960 | Booth | 188—264.2 |
| 1,343,682 | 6/1920 | Richmond | 280—106 |

FOREIGN PATENTS

| 495,146 | 8/1953 | Canada | 188—152 |

PHILIP GOODMAN, Primary Examiner

U.S. Cl. X.R.

188—264.25; 303—2